United States Patent
Zhang et al.

(10) Patent No.: US 12,167,089 B2
(45) Date of Patent: Dec. 10, 2024

(54) METHOD FOR PUSHING ANCHOR INFORMATION, COMPUTER DEVICE, AND STORAGE MEDIUM

(71) Applicant: BIGO TECHNOLOGY PTE. LTD., Singapore (SG)

(72) Inventors: Zhuang Zhang, Guangzhou (CN); Zonghan Zhang, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 168 days.

(21) Appl. No.: 17/786,938

(22) PCT Filed: Oct. 13, 2020

(86) PCT No.: PCT/CN2020/120579
§ 371 (c)(1),
(2) Date: Jun. 17, 2022

(87) PCT Pub. No.: WO2021/120799
PCT Pub. Date: Jun. 24, 2021

(65) Prior Publication Data
US 2023/0043174 A1    Feb. 9, 2023

(30) Foreign Application Priority Data
Dec. 18, 2019 (CN) .......................... 201911311364.0

(51) Int. Cl.
*H04N 21/466* (2011.01)
*H04N 21/2187* (2011.01)
*H04N 21/4788* (2011.01)

(52) U.S. Cl.
CPC ..... *H04N 21/4668* (2013.01); *H04N 21/2187* (2013.01); *H04N 21/4665* (2013.01); *H04N 21/4667* (2013.01); *H04N 21/4788* (2013.01)

(58) Field of Classification Search
None
See application file for complete search history.

(56) References Cited

U.S. PATENT DOCUMENTS

| | | | |
|---|---|---|---|
| 2017/0264919 A1* | 9/2017 | Amine | ................ H04N 21/251 |
| 2019/0163752 A1 | 5/2019 | Barlaskar et al. | |
| 2019/0182514 A1 | 6/2019 | Zhang | |

FOREIGN PATENT DOCUMENTS

| | | |
|---|---|---|
| CN | 104540033 A | 4/2015 |
| CN | 106021478 A | 10/2016 |

(Continued)

OTHER PUBLICATIONS

Extended European Search Report Communication Pursuant to Rule 62 EPC, dated Mar. 20, 2023 in Patent Application No. EP 20903442.0, which is a foreign counterpart application.
International Search Report of the International Searching Authority for State Intellectual Property Office of the People's Republic of China in PCT application No. PCT/CN2020/120579 issued on Dec. 30, 2020, which is an International application corresponding to this U.S. application.

(Continued)

*Primary Examiner* — Omar S Parra
(74) *Attorney, Agent, or Firm* — Kolitch Romano Dascenzo Gates LLC (57) ABSTRACT

Provided are a method for pushing anchor information, a computer device, and a storage medium. The method for pushing the anchor information includes: recalling an anchor user; determining an anchor type of the anchor user by using a live streaming history and a live streaming efficiency as classification dimensions; calculating an interaction score of the anchor user, wherein the interaction score represents a feature of a viewer user viewing a live streaming room of the anchor user; calculating a comprehensive score of the anchor user based on the interaction score and the anchor type; and pushing anchor information of the anchor user to the viewer user based on the comprehensive score.

19 Claims, 4 Drawing Sheets

(56) References Cited

FOREIGN PATENT DOCUMENTS

| | | | |
|---|---|---|---|
| CN | 106227807 | A | 12/2016 |
| CN | 106899856 | A | 6/2017 |
| CN | 107666615 | A | 2/2018 |
| CN | 108073671 | A | 5/2018 |
| CN | 108769756 | A | 11/2018 |
| CN | 108777801 | A | 11/2018 |
| CN | 109086822 | A | 12/2018 |
| CN | 109168048 | A | 1/2019 |
| CN | 109451326 | A | 3/2019 |
| CN | 109905723 | A | 6/2019 |
| CN | 109951724 | A | 6/2019 |
| CN | 110400027 | A | 11/2019 |
| CN | 110996116 | A | 4/2020 |
| WO | 2019062407 | A1 | 4/2019 |

OTHER PUBLICATIONS

The State Intellectual Property Office of People's Republic of China, First Office Action in Patent Application No. CN201911311364.0 issued on Apr. 2, 2021, which is a foreign counterpart application corresponding to this U.S. Patent Application, to which this application claims priority.

The State Intellectual Property Office of People's Republic of China, Second Office Action in Patent Application No. CN201911311364.0 issued on Nov. 4, 2021, which is a foreign counterpart application corresponding to this U.S. Patent Application, to which this application claims priority.

Wei Zheng, et al. Game live broadcast popularity index index selection and model construction, Business Economy, No. 9, Sep. 2018.

* cited by examiner

METHOD FOR PUSHING ANCHOR INFORMATION, COMPUTER DEVICE, AND STORAGE MEDIUM

This application is a U.S. national stage of international application No. PCT/CN2020/120579, filed on Oct. 13, 2020, and claims priority to Chinese Patent Application No. 201911311364.0, filed on Dec. 18, 2019 and entitled "ANCHOR INFORMATION PUSHING METHOD AND DEVICE, COMPUTER EQUIPMENT AND STORAGE MEDIUM", the disclosures of which are herein incorporated herein by reference in their entireties.

TECHNICAL FIELD

The present disclosure relates to the field of live streaming technologies, and particularly relates to a method and apparatus for pushing anchor information, a computer device, and a storage medium.

BACKGROUND

As network technology develops, especially the popularization of mobile terminals, an anchor user can set up a live streaming room on a live streaming platform to livestream things happening around him/her, and viewer users can enter the live streaming room to watch the livestream and interact with the anchor user.

SUMMARY

A method for pushing anchor information is provided, and includes:
recalling an anchor user;
determining an anchor type of the anchor user by using a live streaming history and a live streaming efficiency as classification dimensions;
calculating an interaction score of the anchor user, wherein the interaction score represents a feature of a viewer user viewing a live streaming room of the anchor user;
calculating a comprehensive score of the anchor user based on the interaction score and the anchor type; and
pushing anchor information of the anchor user to the viewer user based on the comprehensive score.

An apparatus for pushing anchor information is further provided, and includes:
an anchor user recalling module, configured to recall an anchor user;
an anchor user classifying module, configured to determine an anchor type of the anchor user by using a live streaming history and a live streaming efficiency as classification dimensions;
an interaction score calculating module, configured to calculate an interaction score of the anchor user, wherein the interaction score represents a feature of a viewer user viewing a live streaming room of the anchor user;
a comprehensive score calculating module, configured to calculate a comprehensive score of the anchor user based on the interaction score and the anchor type; and
an anchor information pushing module, configured to push anchor information of the anchor user to the viewer user based on the comprehensive score.

A computer device is further provided, and includes:
one or more processors; and
a memory configured to store one or more programs;
wherein the one or more processors, when loading and running the one or more programs, are caused to perform the above method for pushing the anchor information.

A computer-readable storage medium is further provided, wherein a computer program is stored in the computer-readable storage medium; and the computer program, when loaded and run by a processor, causes the processor to perform the above method for pushing the anchor information.

DETAILED DESCRIPTION in order to improve the user experience of the viewer users, the live streaming platform screens anchor users to select those that the viewer users may prefer, and pushes user information of those anchor users to the viewer users, such that the viewer users can quickly enter live streaming rooms set up by the anchor users to watch livestream.

The screening and selection of the anchor users are typically determined depending on scoring and ranking by a model based on machine learning, and a score output by the model is mainly determined by multi-dimensional features. In a live-streaming scene, existing anchor users get more push opportunities because of their rich features, while new anchor users only get a few push opportunities due to a lack of features.

With respect to the above approach of screening and selecting of the anchor users, on the one hand, the enthusiasm of the new anchor users is inhibited, adversely affecting the healthy development of the entire live streaming ecosystem; and on the other hand, since the pushed anchor users are concentrated in the existing anchor users with rich features, there are many cases where the anchor users are pushed repeatedly and features of the pushed anchor users are similar, which possibly bores the viewer users. If a viewer user wants to acquire other anchor users, he/she generally needs to search for the anchor users with keywords and then screen and select them, which not only is a waste of resources for screening, selecting and pushing the anchor users, but also leads to cumbersome operations of the viewer user when viewing livestreams.

The present disclosure provides a method and apparatus for pushing anchor information, a computer device, and a storage medium, so as to solve problems of resource waste and cumbersome operations of viewing livestreams caused by centralized push of existing anchor users with rich features.

The present disclosure will be described hereinafter in combination with the accompanying drawings and embodiments.

Embodiment 1

Figure 1:
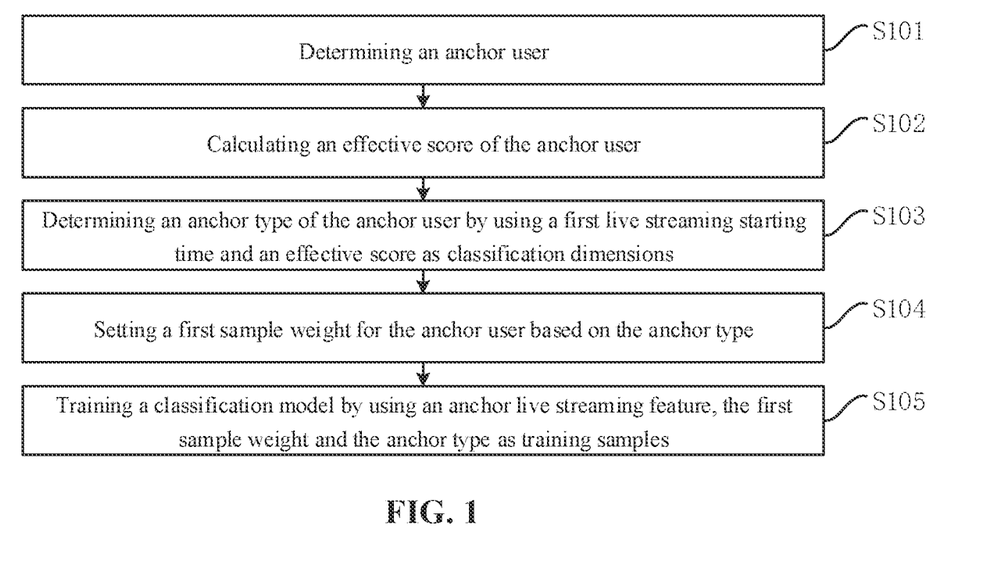
FIG. 1 is a flowchart of a method for pushing anchor information according to Embodiment 1 of the present disclosure.

FIG. 1 is a flowchart of a method for pushing anchor information according to Embodiment 1 of the present disclosure. The present embodiment is applicable to a case of training a classification model. The method may be executed by an apparatus for pushing anchor information. The apparatus for pushing the anchor information may be implemented by software and/or hardware, and may be configured in a computer device such as a personal computer, a server and a workstation. The method includes the following steps.

In S101, an anchor user is determined.

In the present embodiment, some or all of anchor users registered in a live streaming platform may be selected to train the classification model.

The anchor user is a registered user and has the authority to host live programs. In a computer device, the anchor user may be represented by user identification such as a user identifier (ID) and a user account.

In S102, an effective score of the anchor user is calculated.

In the present embodiment, an effective score of each anchor user may be calculated, and represents a live streaming efficiency which may be configured to classify high-quality anchor users and ordinary anchor users.

In implementation, a dimension for measuring the live streaming efficiency may be set according to an actual situation including, for example, stay of viewer users, a gift-receiving situation of the anchor user, and the like.

In these dimensions, first indexes when the anchor user performs live streaming in a specified time period are acquired, and the first indexes may be indexes, such as an avg_stay_time and an avg_follow that both represent the stay of the viewer users, and an avg_gift for representing the gift-receiving of the anchor user, wherein the avg_gift may refer to an average of virtual gifts given by the viewer users, an average of virtual tokens consumed by the viewer users, and other values.

The first index is configured with a first index weight. The first index weight is greater than or equal to 0, is an adjustable parameter, and may be set correspondingly according to an actual need. For example, if anchor users with high gift-receiving values are to be considered as high-quality anchor users, the avg_gift may be set with a larger first index weight. By configuring the first index weight according to the actual need, the classification model can adjust adaptively and dynamically, and is more likely to classify the anchor users with the high gift-receiving values into high-quality anchor users.

In the present embodiment, the effective score may be calculated by a weight sum method. That is, a product of each first index and first index weight is calculated as the first single item efficiency, and the sum of all the first single item efficiencies is calculated as the effective score representing the live streaming efficiency.

The effective_score may be calculated according to the following equation by taking an example in which the avg_stay_time, the avg_follow and the avg_gift as the first index:

$$\text{effecitve\_score} = x * \text{avg\_stay\_time} + y * \text{avg\_follow} + z * \text{avg\_gift}.$$

Here, x is the first index weight of the avg_stay_time, y is the first index weight of the avg_follow, and z is the first index weight of the avg_gift.

The above way for calculating the effective score is only an example. In the implementation of present embodiment, another way for calculating the effective score may be set according to an actual situation. For example, based on the above way for calculating the effective score, the first index weight is attenuated according to the time of the first index, such that the value of the first index weight that is more proximal to a current time is larger, and the value of the first index weight that is more distal from the current time is smaller. Or, the increase of the first index represents a dimension of the activity of the viewer users, such as an average bullet chat, which is not limited in the present embodiment.

In S103, an anchor type of the anchor user is determined by using a first live streaming starting time and the effective score as classification dimensions.

The anchor user is associated with the first live streaming starting time, namely, the time when the anchor user hosts a live streaming program for the first time. This first live streaming starting time may represent a live streaming history which may be configured to classify new anchor users and existing anchor users.

Besides the first live streaming starting time, the live streaming history may also be represented by other ways, such as the registration time of the anchor user, and the frequency of live streaming by the anchor user within a predetermined time period, which is not limited in the present embodiment.

Anchor live streaming features may be analyzed for the anchor users, and the anchor live streaming features are features of anchor users reflected in the live streaming room. These anchor live streaming features are stored in a database. During training of the classification model, the anchor live streaming features may be read from the database.

The anchor live streaming feature includes the following features.

1. Offline Features of Anchor User

The offline features of the anchor user are features of the anchor user reflected when the anchor user hosts a live streaming program during a non-live-streaming time period, such as a registration time, average active time, history live streaming starting time, number of followers, and a total gift-receiving value.

2. Real-Time Features of Anchor User

The real-time features of the anchor user are features of the anchor user reflected when the anchor user hosts the live streaming program during a live-streaming time period, such as real-time popularity, a gender, a country, a language, and a live streaming type.

In the present embodiment, both the first live streaming starting time and the effective score are used as the classification dimension to determine the anchor types of the anchor users, and the anchor users are classified into four types, namely, a first type, a second type, a third type and a fourth type.

The first live streaming starting time of the anchor user in the first type and the first live streaming starting time of the anchor user in the second type are both later than the first live streaming starting time of the anchor user in the third type and the first live streaming starting time of the anchor user in the fourth type.

The effective score of the anchor user in the first type is lower than that of the anchor user in the second type.

The effective score of the anchor user in the third type is lower than that of the anchor user in the fourth type.

The anchor user in the first type may be called an ordinary new anchor user; the anchor user in the second type may be called a high-quality new anchor user; the anchor user in the third type may be called an ordinary existing anchor user; and the anchor user in the fourth type may be called a high-quality existing anchor user.

In an implementation, the anchor users may be classified into a first group and a second group, wherein the first live streaming starting times of the anchor users in the first group are later than those of the anchor users in the second group.

In a classifying way, a first threshold and a second threshold may be predetermined, and both belong to (0, 1).

Anchor types of the anchor users in the first group are classified into the first type and the second type, wherein the effective score of the anchor user in the first type is less than or equal to the first threshold, and the effective score of the anchor user in the second type is greater than the first threshold, such that the effective score of the anchor user in the first type is less than that of the anchor user in the second type.

Anchor types of the anchor users in the second group are classified into the third type and the fourth type, wherein the effective score of the anchor user in the third type is less than or equal to the second threshold, and the effective score of the anchor user in the fourth type is greater than the second threshold, such that the effective score of the anchor user in the third type is less than that of the anchor user in the fourth type.

During dividing the first group and the second group, a quantile of the first live streaming starting time of each of the anchor users may be counted, and the first live streaming starting time corresponding to a specified quantile may be used as a live streaming starting time threshold, wherein the specified quantile belongs to (0,1).

Anchor users whose first live streaming starting times are less than or equal to the live streaming starting time threshold are organized into the first group.

Anchor users whose first live streaming starting times are greater than the live streaming starting time threshold are organized into the second group.

In S104, a first sample weight of the anchor user is set based on the anchor type.

In the present embodiment, for the anchor types such as the first type, the second type, the third type and the fourth type, first sample weights of the anchor users in the second type and the fourth type can be increased, and/or, first sample weights of the anchor users in the first type and the third type can be reduced, such that the first sample weights of the anchor users in the second type and the fourth type are greater than those for the anchor users in the first type and the third type. Since machine learning is more sensitive to samples with greater first sample weights, it is conducive to more accurate selection of high-quality new anchor users and high-quality existing anchor users among the anchor users by the classification model.

In an example of setting the first sample weight, the effective score of the anchor user in the second type is assigned as the first sample weight of the anchor user in the second type.

The effective score of the anchor user in the fourth type is assigned as the first sample weight of the anchor user in the fourth type.

The first sample weight of the anchor user in the first type is set to a specified first value (such as 1), wherein the first value is less than the effective score of the anchor user in the first type.

The first sample weight of the anchor user in the third type is set to a specified first value (such as 1), wherein the first value is less than the effective score of the anchor user in the third type.

The above ways of setting the first sample weight are only examples. During the implementation of the present embodiment, other ways of setting the first sample weight may be set according to actual situations, which are not limited in the present embodiment.

In S105, the classification model is trained by using the anchor live streaming feature, the first sample weight and the anchor type as training samples.

In the present embodiment, after the anchor live streaming feature, the first sample weight and the anchor type (namely, a tag) are determined, they are used as the training sample to train the classification model, such that the classification model can acquire the anchor types by classifying the anchor users with the live streaming history and the live streaming efficiency as classification dimensions.

The classification model may be regarded as a function mapping, and a training process of the classification model is an optimization and solution process of a function. The goal of the optimization and solution is to continuously update parameters contained in the classification model; after the classification model calculates labeled training samples serving as input data, a loss value between an output predicted value and a label is the smallest.

As the number of the anchor types is generally two or more, the classification model is generally a multi-class classification model, such as a softmax function, an extreme gradient boosting (XGBoost) function, a random forest, and a deep neural network.

Taking the softmax function as an example, the softmax function maps outputs of a plurality of neurons to values of (0,1), and a cumulative sum of these values is 1 (satisfying the property of the probability), which may be understood as the probability, such that multi-classification can be performed. The classification model is expressed as follows:

$$logit_i = \sum_{j=1}^{n} W_{ik} \times X_k + B_i, \text{ and}$$

$$score_i = \frac{e^{logit_i}}{\sum_{j=1}^{n} e^{logit_j}}.$$

Here, i represents an $i^{th}$ anchor user; j represents a $j^{th}$ anchor user; k represents a $k^{th}$ anchor live streaming feature; n represents the total number of anchor users; W represents a first parameter; B represents a second parameter; X represents an anchor live streaming feature; log it represents a second target value; and score represents the probability that the anchor user belongs to an anchor type, and score∈ (0, 1).

The first parameter and the second parameter belong to parameters in the classification model, and are acquired by training the classification model. Generally, the value range of the first and second parameters are (−∞, +∞). That is, there is no limit to the value range, because the value of the first parameter depends on the distribution of the anchor live streaming feature itself. Since different extraction methods, feature cleaning methods and the like will lead to different distributions of the same anchor live streaming feature, the value range of the first parameter is not limited. Generally, an absolute value of the first parameter is positively correlated with the importance of the anchor live streaming feature. That is, the greater the absolute value of the first parameter is, the more important the anchor live streaming feature is.

Embodiment 2

Figure 2:
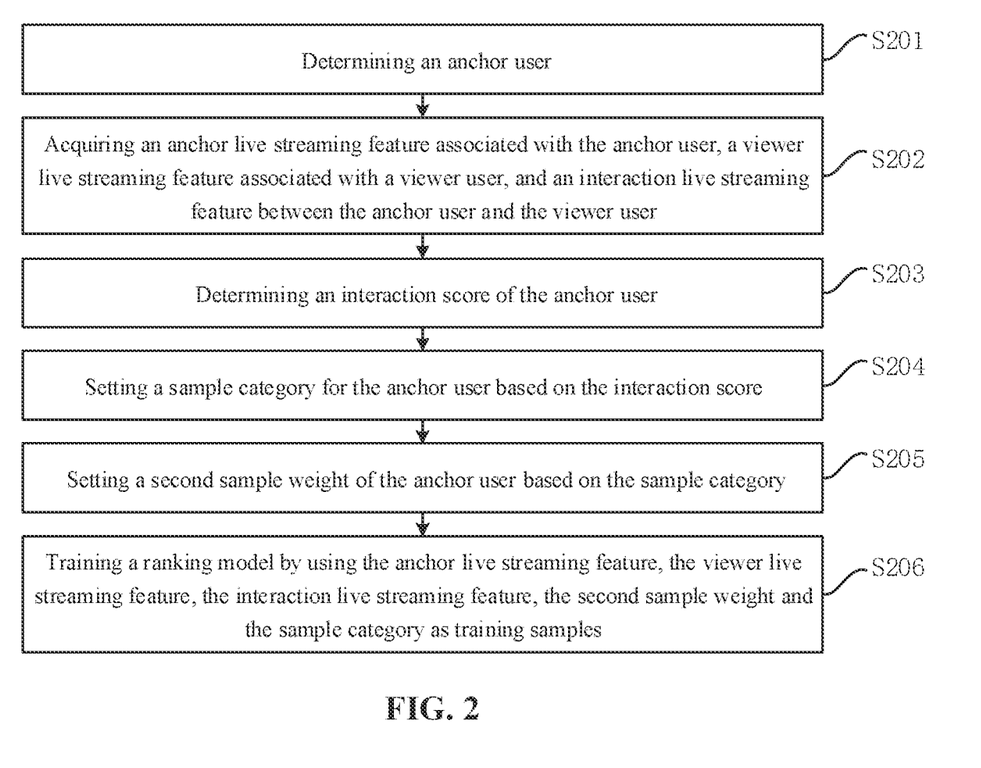
FIG. 2 is a flowchart of a method for pushing anchor information according to Embodiment 2 of the present disclosure.

FIG. 2 is a flowchart of a method for pushing anchor information according to Embodiment 2 of the present disclosure. The present embodiment is applicable to a case of training a ranking model. The method includes the following steps.

In S201, an anchor user is determined.

In S202, an anchor live streaming feature associated with the anchor user, a viewer live streaming feature associated with a viewer user, and an interaction live streaming feature between the anchor user and the viewer user are acquired.

In the present embodiment, the anchor live streaming feature of the anchor user, the viewer live streaming feature, and the interaction live streaming feature between the anchor user and the viewer user may be analyzed. The anchor live streaming feature, the viewer live streaming feature and the interaction live streaming feature may be stored in a database. During training of the ranking model, the anchor live streaming feature, the viewer live streaming feature, and the interaction live streaming feature are extracted from the database.

The viewer live streaming feature is a feature of a viewer user that may be reflected in a live streaming room.

The viewer user live streaming feature includes the following features.

1. Offline Feature of Viewer User

The offline feature of the viewer user is a feature of the viewer user reflected in the live streaming room during a non-live-streaming time period, and includes, for example, an average viewing time, the total number of gifts given out in history, and so on.

2. Real-Time Feature of Viewer User

The real-time feature of the viewer user is a feature of the viewer user reflected in the live streaming room during a live-streaming time period, such as an online duration, a gender, a country, a language, and the like.

The interaction live streaming feature between the anchor user and the viewer user is a feature that may be reflected in the interaction between the anchor user and the viewer user when the anchor user hosts a live streaming program, and includes, for example, a history viewing duration of the viewer user to the anchor user, the history total number of virtual gifts given to the anchor user by the viewer user, whether following the anchor user by the audience use, and so on.

In S203, an interaction score of the anchor user is determined.

In the present embodiment, an interaction score of each anchor user may be calculated, and the interaction score represents a feature of a viewer user viewing a live streaming room of the anchor user.

In an implementation, second indexes when the anchor user performs live streaming in a specified time period are acquired from dimensions of the interaction between the anchor user and the viewer user, and the second indexes include, for example, an avg_stay_time, an avg_follow, an avg_gift, and so on.

The second index is configured with a second index weight. The second index weight is greater than or equal to 0, is an adjustable parameter, and may be set correspondingly according to an actual need. For example, if anchor users with high gift-receiving values are considered to be high-quality anchor users, the avg_gift may be set with a greater second index weight. By configuring the second index weight according to the actual need, the ranking model can adjust adaptively and dynamically, and it is more likely to push anchor users with high gift-receiving values to the viewer user.

In the present embodiment, the interaction score may be calculated by a weight sum method. That is, a product of the second index and the second index weight is calculated as second single item efficiency, and the sum of all the second single item efficiencies is calculated as the interaction score of the anchor user.

The interaction_score may be calculated according to the following equation by taking an example in which the avg_stay_time, the avg_follow and the avg_gift as the second index:

$$\text{interaction\_score} = a*\text{avg\_stay\_time} + b*\text{avg\_follow} + c*\text{avg\_gift}.$$

Here, a is the second index weight of the avg_stay_time, b is the second index weight of the avg_follow, and c is the second index weight of the avg_gift.

The above way for calculating the interaction score is only an example. In an implementation of the present embodiment, another way for calculating the interaction score may be set according to an actual situation. For example, based on the above way for calculating the interaction score, the second index weight is attenuated according to the time of the second index, such that the value of the second index weight that is more proximal to a current time is larger, and the value of the second index weight that is more distal from the current time is smaller. Or, the increase of the second index represents a dimension of the activity of the viewer users, such as an average bullet chat, which is not limited in the present embodiment.

In S204, a sample category for the anchor user is set based on the interaction score.

In an implementation, the interaction score may be compared with a predetermined interaction threshold (e.g., 0).

If the interaction score is greater than the interaction threshold, the sample category for the anchor user is set as a first category (e.g., 1).

If the interaction score is less than or equal to the interaction threshold, the sample category for the anchor user is set as a second category (e.g., 0).

In S205, a second sample weight of the anchor user is set based on the sample category.

In the present embodiment, for the sample categories of the first category and the second category, the second sample weight of the anchor user in the first category can be increased, and/or the second sample weight of the anchor user in the second category can be decreased, such that the second sample weight of the anchor user in the first category is greater than that of the anchor user in the second category. Because machine learning is more sensitive to the samples with lager second sample weights, it is beneficial for the ranking model to more accurately improve the rankings of high-quality anchor users and reduce the rankings of ordinary anchor users.

In an example of setting the second sample weight, the interaction score of the anchor user in the first category is assigned as the second sample weight of the anchor user in the first category.

The second sample weight of the anchor user in the second category is set to a specified second value (such as 1), wherein the second value is less than the interaction score of the anchor user in the first category.

The above ways of setting the second sample weight are only examples. During the implementation of the present embodiment, other ways of setting the second sample weight may be set according to actual situations, which are not limited in the present embodiment.

In S206, the ranking model is trained by using the anchor live streaming feature, the viewer live streaming feature, the interaction live streaming feature, the second sample weight and the sample category as training samples.

In the present embodiment, after the anchor live streaming feature, the viewer live streaming feature, the interaction live streaming feature, the second sample weight and the sample category (namely, a tag) are determined, they are used as the training sample to train the ranking model, such that the ranking model can be used for calculating the interaction score of the anchor user.

The ranking model may be regarded as a function mapping, and a training process of the ranking model is an optimization and solution process of a function. The goal of the optimization and solution is to continuously update parameters contained in the ranking model; after the ranking model calculates labeled training samples serving as input data, a loss value between an output predicted value and a label is the smallest.

As the number of sample categories is generally two, the ranking model is generally a one-class classification model, also known as a two-class classification model. The one-class classification model is a special classification task, in which most training samples are positive samples, while other samples are generally classified into another category such as a logistic regression (LR) function; a support vector machine (SVM); Lenet, Alexnet and a visual geometry group net (VGGnet) in a convolutional neural network (CNN); and isolation forest.

Taking the LR function as an example, by inputting an attribute feature sequence of an object in an unknown category, the LR function acquires the category of the object. Since the LR function is a probability distribution function, for one-class classification, the more distal an object from the center point is, the greater the possibility that it belongs to a category is. The ranking model is shown as follows:

$$logit_i = \sum_{i=1}^{n} Y_i \times Z_i + C_i; \text{ and}$$

$$rank\_score = \frac{1}{1 + e^{logit_i}}.$$

Here, i represents an $i^{th}$ anchor user; n represents the total number of anchor users; Y represents a third parameter; C represents a fourth parameter; Z represents an anchor live streaming feature, a viewer live streaming feature and an interaction live streaming feature; log it represents a fourth target value; and rank_score represents an interaction score of the anchor user, and rank_score∈ (0, 1).

The third parameter and the fourth parameter belong to parameters in the ranking model, and are acquired by training the ranking model. Generally, the value range of the third and fourth parameters is (−∞, +∞). That is, there is no limit to the value range, because the value of the third parameter depends on the distribution of the anchor live streaming feature itself. Since different extraction methods, feature cleaning methods and the like will lead to different distributions of the same anchor live streaming feature, viewer live streaming feature and interaction live streaming feature, the value range of the third parameter is not limited. Generally, an absolute value of the third parameter is positively correlated with the importance of the anchor live streaming feature, viewer live streaming feature and interaction live streaming feature. That is, the greater the absolute value of the first parameter is, the more important the anchor live streaming feature, the viewer live streaming feature and the interaction live streaming feature are.

Embodiment 3

Figure 3:
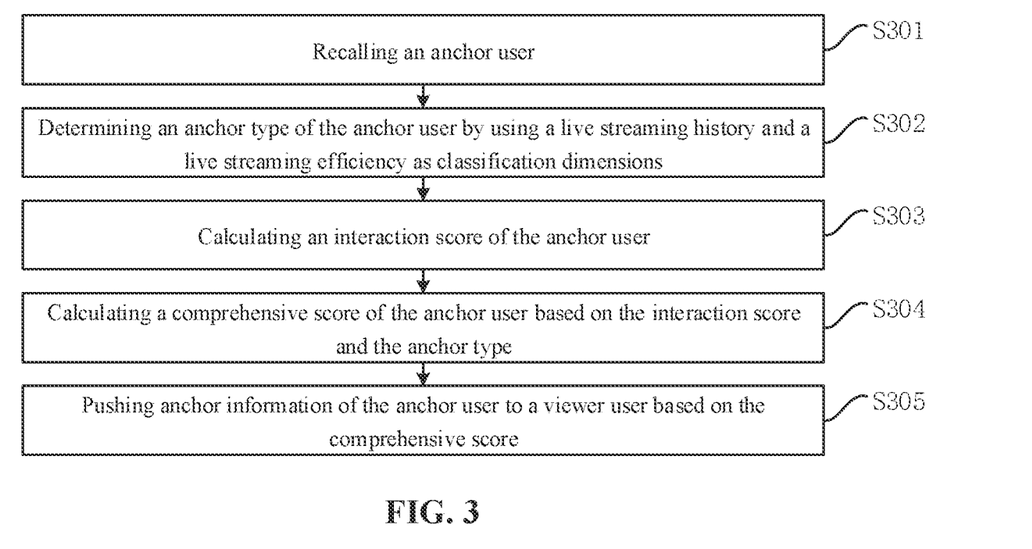
FIG. 3 is a flowchart, of a method for pushing anchor information according to Embodiment 3 of the present disclosure.

FIG. 3 is a flow-chart of a method for pushing anchor information according to Embodiment 3 of the present disclosure. The present embodiment is applicable to a case of classifying anchor users, calculating interaction scores of the anchor users, and pushing the anchor users. The method includes the following steps.

In S301, an anchor user is recalled.

In a live streaming platform, a large number of anchor users are registered to form an anchor pool. Before the anchor users are pushed to viewer users, a candidate pool may be formed by recalling the anchor users from the anchor pool based on different recalling strategies and according to different business requirements (such as recalling high-quality anchor users, and recalling anchor users who meet personalized needs of the anchor users).

In an implementation, the recalling strategies include, but are not limited to:

online recalling (recalling online anchor users), subscription recalling (recalling anchor users whose programs (such as a game, and dining) are subscribed by viewer users, same-country recalling (recalling anchor users in the same country as the viewer users), same-language recalling (recalling anchor users in the same language as the viewer users), collaborative filtering recalling (recalling anchor users using a collaborative filtering algorithm), preference recalling (recalling anchor users with the same preferences as the viewer users), similar recalling (recalling other anchor users similar to the recalled anchor users).

Since the same anchor users may be recalled using different recalling strategies, the acquired recalled anchor users are generally deduplicated.

In S302, an anchor type of the anchor user is determined by using a live streaming history and a live streaming efficiency as classification dimensions.

In the present embodiment, the anchor users may be classified into a new anchor user and an existing anchor user in the case that the live streaming history serves as the classification dimension, and may be classified into a high-quality anchor user and an ordinary anchor user in the case that the live streaming efficiency serves as the classification dimension.

Thus, the anchor types of the classified anchor users include a first type, a second type, a third type and a fourth type.

The live streaming history of the anchor users in the first type and the second type are shorter than the live streaming history of the anchor users in the third type and the fourth type.

The live streaming efficiency of the anchor user in the first type is lower than that of the anchor user in the second type.

The live streaming efficiency of the anchor user in the third type is lower than that of the anchor user in the fourth type.

The anchor user in the first type may be called an ordinary new anchor user; the anchor user in the second type may be called a high-quality new anchor user; the anchor user in the third type may be called an ordinary existing anchor user; and the anchor user in the fourth type may be called a high-quality existing anchor user.

In S303, an interaction score of the anchor user is calculated.

In the present embodiment, an interaction score of the recalled anchor user may be calculated, and represents a feature of a viewer user viewing a live streaming room of the anchor user.

In a live streaming scene, information between the anchor user and the viewer user is a main component of the feature; and positive interaction often causes a relatively high possibility of recommendation.

In S304, a comprehensive score of the anchor user is calculated based on the interaction score and the anchor type.

In the present embodiment, for different anchor types, the comprehensive scores may be generated based on adaptive adjustment and the interaction scores, such that the ranks of the anchor users can be adjusted according to business requirements.

In S305, anchor information of the anchor user is pushed to the viewer user based on the comprehensive score.

Due to the large number of the recalled anchor users and limited display positions, some of the anchor users may be selected from the recalled anchor users with reference to the comprehensive score, and anchor information (such as anchor names and the thumbnails of live streaming rooms) of the selected anchor users are pushed to the viewer user for browsing.

The pushing to the viewer user refers to pushing to a client side with the data representing the viewer user, and the client side may be, for example, a browser, a live streaming application, an instant messaging tool, and the like.

If the viewer user is a non-registered user, he/she can be represented by equipment data such as equipment identification like an international mobile equipment identity (IMEI). Features of the non-registered user are sparse, and a non-personalized anchor user may be recalled in S301, such that anchor information of the non-personalized anchor user is pushed to the viewer user.

If the viewer user is a registered user, he/she can be represented by user data such as a user ID and a user account. Features of the registered user are relatively rich, and a personalized anchor user can be recalled in S301, such that anchor information of the personalized anchor user is pushed to the viewer user.

In a way of selecting the anchor users, the recalled anchor users may be ranked in a descending order based on the comprehensive scores thereof; and n (n is a positive integer, which is an adjustable parameter such as 20) anchor users with the highest rankings are selected to be pushed to the viewer user.

In addition to selecting the n anchor users with the highest comprehensive scores, other ways may also be adopted to select the anchor users. For example, anchor users whose comprehensive scores are greater than or equal to a predetermined score threshold are selected to be pushed; anchor users whose comprehensive scores are lower than the predetermined score threshold are filtered out and n anchor users with the highest comprehensive scores are selected from the reserved anchor users to be pushed; similar cases are not limited in the present embodiment.

In the present embodiment, the anchor user is recalled, and is classified into the anchor type by using the live streaming history and the live streaming efficiency as the classification dimensions; the interaction score of the anchor user is calculated, and represents the feature of the viewer user viewing the live streaming room of the anchor user; the comprehensive score of the anchor user is calculated based on the interaction score and the anchor type; and the anchor information of the anchor user is pushed to the viewer user based on the comprehensive score. The anchor users may be classified into the new anchor user and the existing anchor user based on the live streaming history, and may be classified into the high-quality anchor user and the ordinary anchor user based on the live streaming efficiency. For the anchor users in the different anchor types, the interaction values may be adaptively adjusted to adjust push opportunities. On the premise that the interaction value meets a quality requirement of the anchor user, different business requirements can be met through adjustment, such that the new anchor user with fewer features can acquire more push opportunities. On the one hand, the enthusiasm of the new anchor user can be improved, and the healthy development of the entire live streaming ecosystem is ensured. On the other hand, the diversity of the pushed anchor users is increased, situations of repeated pushing of the anchor users and pushing of the anchor users with similar features are reduced, and pushing accuracy of anchor users interested in the viewer user is improved, such that the viewer user can directly browse live streaming programs hosted by the interested anchor users after the push, and cases that the viewer user searches for the anchor users with keywords and then screens and selects the anchor users are reduced, thereby reducing waste of resources for screening, selecting and pushing the anchor users, and improving the operation simplicity of the viewer user viewing livestreams.

Embodiment 4

Figure 4:
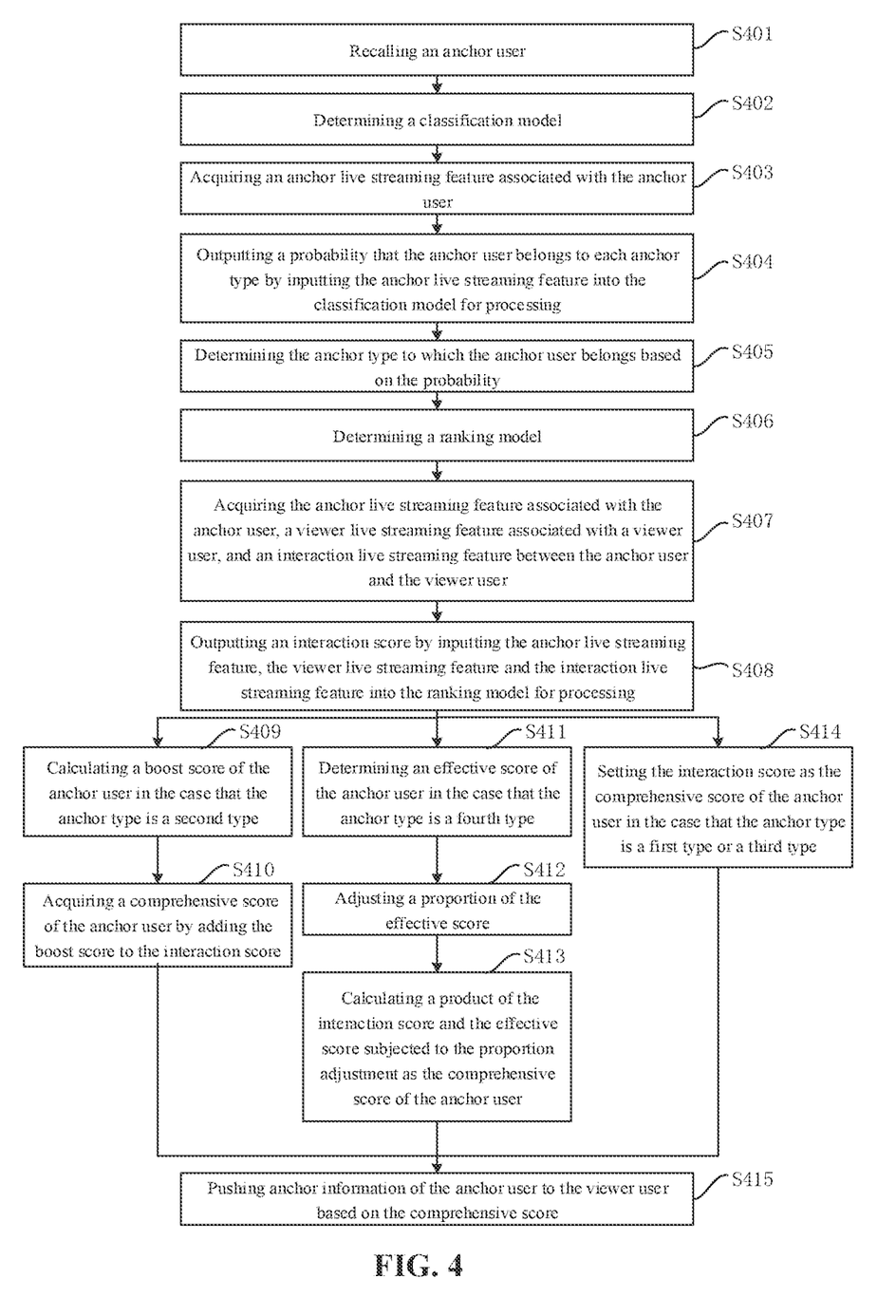
FIG. 4 is a flowchart of a method for pushing anchor information according to Embodiment 4 of the present disclosure.

FIG. 4 is a flow chart of a method for pushing anchor information according to Embodiment 4 of the present disclosure. Based on the foregoing embodiments, the present embodiment adds processing operations of classifying anchor users using a classification model, calculating interaction scores of the anchor users using a ranking model, and adjusting comprehensive scores of the anchor users in four anchor types respectively. The method includes the following steps.

In S401, an anchor user is recalled.

In S402, the classification model is determined.

In the present embodiment, the classification model may be trained offline in advance, and the classification model and its parameters are stored. The classification model may be configured to determine the anchor users with a live streaming history and a live streaming efficiency as classification dimensions.

Since a training way of the classification model is basically similar to that in Embodiment 1, the description thereof is relatively simple. Related parts can refer to the partial description in Embodiment 1, and are not described in detail in the present embodiment.

During online classification of the anchor users, the classification model and its parameters may be loaded.

In S403, an anchor live streaming feature associated with the anchor user is acquired.

In the present embodiment, the anchor live streaming features may be analyzed for the anchor user, and may be features of the anchor user reflected in the live streaming room. These anchor live streaming features are stored in a database, and may be read from the database during classification of the anchor user by the classification model.

The anchor live streaming features include the followings features.
1. Offline Features of the Anchor User; and 2. Real-Time Features of the Anchor User.

In S404, a probability that the anchor user belongs to each anchor type is output by inputting the anchor live streaming feature into the classification model for processing.

In the present embodiment, as the number of the anchor types is generally two or more, the classification model is generally a multi-class classification model, such as a softmax function, an XGBoost function, a random forest, and a deep neural network.

Taking the softmax function as an example, the softmax function maps outputs of a plurality of neurons to values of (0,1), and a cumulative sum of these values is 1 (satisfying the property of the probability), which may be understood as the probability, such that multi-classification can be performed. The classification model is expressed as follows:

$$logit_i = \sum_{k=1}^{n} W_{ik} \times X_k + B_i; \text{ and}$$

$$score_i = \frac{e^{logit_i}}{\sum_{j=1}^{n} e^{logit_j}}.$$

Here, i represents an $i^{th}$ anchor user; j represents a $j^{th}$ anchor user; k represents a $k^{th}$ anchor live streaming feature; n represents the total number of anchor users; W represents a first parameter; B represents a second parameter; X represents an anchor live streaming feature; log it represents a second target value; and score represents the probability that the anchor user belongs to an anchor type, and score∈ (0, 1).

In this example, the first parameter and the second parameter corresponding to the anchor live streaming feature may be determined; a first target value is acquired by calculating the sum of products of the anchor live streaming features and the first parameters; and the second target value is acquired by adding the second parameter to the first target value.

The probability that the anchor user belongs to each anchor type is acquired by classifying the second target value using the softmax function.

In the case of using other classification models, other ways may be adopted to calculate the probability that the anchor user belongs to each anchor type, which is not limited in the present embodiment.

In S405, an anchor type to which the anchor user belongs is determined based on the probability.

In the present embodiment, the anchor type with the largest probability value is selected as the anchor type to which the anchor user belongs.

For example, in the case that the anchor types include the first type, the second type, the third type and the fourth type, the classification model outputs four probability values which are expressed by vectors as [score_1, score_2, score_3, and score_4]. Here, score_1 represents the probability that the anchor user belongs to the first type, score_2 represents the probability that the anchor user belongs to the second type, score_3 represents the probability that the anchor user belongs to the third type, score_4 represents the probability that the anchor user belongs to the fourth type, and score_1+score_2+score_3+score_4=1. Assuming that after the anchor live streaming feature of an anchor user is input into the classification model, and the output probability values are [0.1, 0.3, 0.15, and 0.45], it can be determined that the anchor user belongs to the fourth type.

In S406, a ranking model is determined.

In the present embodiment, the ranking model may be trained offline in advance, and the ranking model and its parameters are stored. The ranking model is configured to calculate an interaction score of the anchor user.

Since a training way of the ranking model is basically similar to that in Embodiment 2, the description thereof is relatively simple. Related parts can refer to the partial description in Embodiment 2, and are not described in detail in the present embodiment.

During online calculation of the interaction score of the anchor user, the ranking model and its parameters may be loaded.

In S407, an anchor live streaming feature associated with the anchor user, a viewer live streaming feature associated with a viewer user, and an interaction live streaming feature between the anchor user and the viewer user are acquired.

In the present embodiment, the anchor live streaming feature of the anchor user, the viewer live streaming feature, and the interaction live streaming feature between the anchor user and the viewer user may be analyzed. The anchor live streaming feature, the viewer live streaming feature and the interaction live streaming feature may be stored in a database. During calculation of the interaction score of the anchor user by the ranking model, the anchor live streaming feature, the viewer live streaming feature, and the interaction live streaming feature are extracted from the database.

The viewer live streaming feature is a feature of a viewer user that may be reflected in a live streaming room.

The viewer user live streaming feature includes the following features.
1. Offline feature of viewer user
2. Real-time feature of viewer user The interaction live streaming feature between the anchor user and the viewer user is a feature that may be reflected in the interaction between the anchor user and the viewer user when the anchor user hosts a live streaming program.

In S408, an interaction score is output by inputting the anchor live streaming feature, the viewer live streaming feature and the interaction live streaming feature into the ranking model for processing.

In the present embodiment, the ranking model is generally a one-class classification model, also known as a two-class classification model, such as an LR function; an SVM; Lenet, Alexnet and a VGGnet in a CNN; and isolation forest.

Taking the LR function as an example, by inputting an attribute feature sequence of an object in an unknown category, the LR function acquires the category of the object. Since the LR function is a probability distribution function, for one-class classification, the more distal an object from the center point is, the greater the possibility that it belongs to a category is. The ranking model is shown as follows:

$$logit_i = \sum_{i=1}^{n} Y_i \times Z_i + C_i; \text{ and}$$

$$rank\_score = \frac{1}{1 + e^{logit_i}}.$$

Here, i represents an $i^{th}$ anchor user; n represents the total number of anchor users; Y represents a third parameter; C represents a fourth parameter; Z represents an anchor live streaming feature, a viewer live streaming feature and an interaction live streaming feature; log it represents a fourth target value; and rank_score represents an interaction score of the anchor user, and rank_score∈ (0, 1).

Thus, in this example, the third parameters respectively corresponding to the anchor live streaming feature, the viewer live streaming feature and the interaction live streaming feature, and the fourth parameter can be determined; a third target value is acquired by calculating the sum of products of the anchor live streaming feature and the third parameter, the viewer live streaming feature and the third parameter and the interaction live streaming feature and the third parameter; and the fourth target value is acquired by adding the fourth parameter to the third target value.

The interaction score is acquired by using a logistic regression function to classify the fourth target value.

In the case of using other ranking models, other ways may be adopted to calculate the interaction score of the anchor user, which is not limited in the present embodiment.

In S409, in the case that the anchor type is the second type, a boost score of the anchor user is calculated.

In S410, a comprehensive score of the anchor user is acquired by adding the boost score to the interaction score.

If the anchor type of an anchor user is the second type, it means that the anchor user is a high-quality new anchor user. Because of the lack of interaction with a viewer user, the new anchor user generally has a lower interaction score than an existing anchor user, and thus, only acquires less traffic during the traffic distribution process, which inhibits the activity of the new anchor user.

In the present embodiment, the high-quality new anchor user is properly boosted to raise its ranking. However, meanwhile, since the live streaming efficiency of the new anchor user is generally lower than that of the existing anchor user, an excessive boost will bring a negative effect. Thus, there is a limitation to the boost.

The expectation for the high-quality new anchor user is that after the initial boost, the high-quality new anchor user becomes an existing anchor user who can acquire higher interaction score by virtue of his/her excellent abilities, and thus becomes a high-quality existing anchor user who can acquire more traffic without a boost. Therefore, the quality of anchors in the entire live streaming ecosystem is improved.

In an implementation, a boost score may be added to the anchor user when a boost is performed every time. The boost score is negatively correlated with the times of calculating the boost score, namely, negatively correlated with the times of performing boosting. The fewer the times of calculating the boost score is, the larger the boost score is. Conversely, the more the times of calculating the boost score is, the less the boost score is, until it is 0.

In a way of calculating the boost score, on the one hand, a base score may be determined. The base score is less than an interaction score of an anchor user in a specified ranking, such that during boosting of the high-quality new anchor user, an impact on the high-quality existing anchor user and a possible negative effect can be controlled.

On the other hand, a boost coefficient may be determined. The boost coefficient is negatively correlated with the times of calculating the boost score, namely, negatively correlated with the times of performing boosting. The fewer the times of calculating the boost score is, the larger the boost score is. Conversely, the more the times of calculating the boost score is, the less the boost score is, until it is 0.

A product of the base score and the boost coefficient is calculated as the boost score.

The above way of calculating the boost score may be achieved by the following equations:

$$\text{final\_score} = \text{rank\_score} + \text{boost\_score};$$

$$\text{boost\_score} = \text{base\_score} \times \left(1 - \frac{\text{process}}{\text{goal}}\right); \text{ and}$$

$$\text{base\_score} = \max(\text{rank\_score}_{mid} - \text{rank\_score}, 0).$$

Here, final_score is a comprehensive score of an anchor user, rank_score is an interaction score of the anchor user, boost_score is a boost score of the anchor user, base_score is a base score of the anchor user, $$\left(1 - \frac{\text{process}}{\text{goal}}\right)$$

is a boost coefficient of the anchor user, process is the times of calculating the boost score, goal is an upper limit of the calculation of the boost score, and $\text{rank\_score}_{mid}$ is a middle score of interaction scores of all anchor users.

In S411, in the case that the anchor type is the fourth type, an effective score of the anchor user is determined.

In S412, a proportion of the effective score is adjusted.

In S413, a product of the interaction score and the effective score subjected to the proportion adjustment is calculated as a comprehensive score of the anchor user.

If the anchor type of an anchor user is the fourth type. That is, the anchor user is a high-quality existing anchor user. By virtue of the excellent effective score, the anchor user is worthy of more traffic with respect to other anchor users in the traffic distribution process. Thus, it is also possible to boost the high-quality existing anchor user.

If the effective score of the anchor user has been calculated during the training of the classification model, it may be directly extracted. If the effective score of the anchor user has not been calculated during the training of the classification model, it may be calculated by referring to the way in Embodiment 1, which is not described in detail in the present embodiment.

In the present embodiment, the ordinary existing anchor user may be measured with regard to the high-quality existing anchor user by adjusting the proportion, and the comprehensive score of the high-quality existing anchor user may be dynamically controlled by adjusting the proportion.

The above way of calculating the boost score can be achieved by the following equation:

$$\text{final\_score}=(1+(n*\text{effective\_score}))*\text{rank\_score}.$$

Here, final_score is a comprehensive score of an anchor user; effective_score is an effective score of the anchor user; rank_score is an interaction score of the anchor user; and $n \in (0, 1)$, and is configured to measure a proportion between the ordinary existing anchor user and the high-quality existing anchor user.

In S414, in the case that the anchor type is the first type or the third type, the interaction score is set as the comprehensive score of the anchor user.

If the anchor type of an anchor user is the first type or the third type, the anchor user is an ordinary new anchor user or an ordinary existing anchor user. For the anchor users in the two anchor types, boosting may not be performed, and the interaction scores of the anchor users are used as their comprehensive scores.

The above way of calculating the comprehensive score is only an example. During the implementation of the present embodiment, other ways of calculating the comprehensive score may be set according to actual situations, which are not limited in the present embodiment.

In S415, anchor information of the anchor user is pushed to the viewer user based on the comprehensive score.

Embodiment 5

Figure 5:
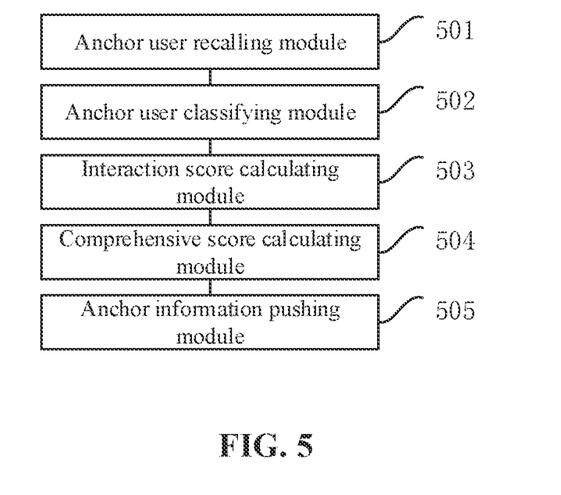
FIG. 5 is a schematic structure diagram of an apparatus for pushing anchor information according to Embodiment 5 of the present disclosure.

FIG. 5 is a schematic structure diagram of an apparatus for pushing anchor information according to Embodiment 5 of the present disclosure. The apparatus may include the following modules.

An anchor user recalling module 501 is configured to recall an anchor user; an anchor user classifying module 502 is configured to determine an anchor type of the anchor user by using a live streaming history and a live streaming efficiency as classification dimensions; an interaction score calculating module 503 is configured to calculate an interaction score of the anchor user, wherein the interaction score represents a feature of a viewer user viewing a live streaming room of the anchor user; a comprehensive score calculating module 504 is configured to calculate a comprehensive score of the anchor user based on the interaction score and the anchor type; and an anchor information pushing module 505 is configured to push anchor information of the anchor user to the viewer user based on the comprehensive score.

Embodiment 6

Figure 6:
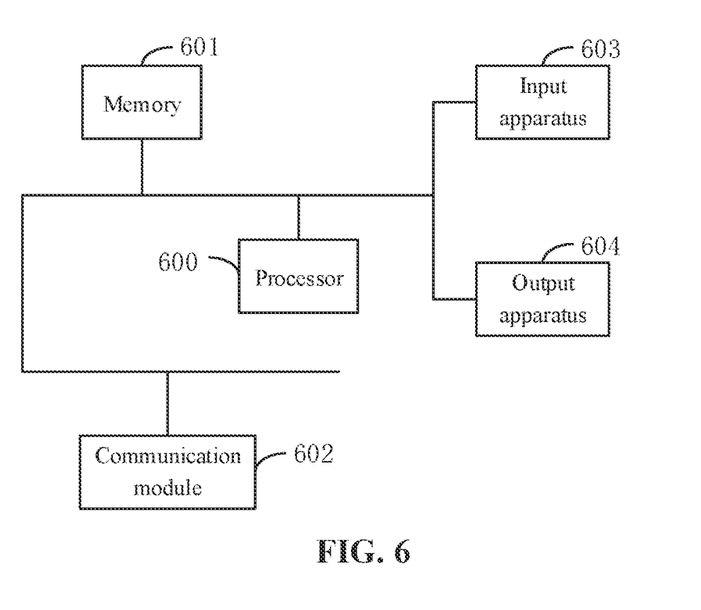
FIG. 6 is a schematic structure diagram of a computer device according to Embodiment 6 of the present disclosure.

FIG. 6 is a schematic structure diagram of a computer device according to Embodiment 6 of the present disclosure. As shown in FIG. 6, the computer device includes a processor 600, a memory 601, a communication module 602, an input apparatus 603 and an output apparatus 604. The number of the processors 600 in the computer device may be one or more. In FIG. 6, one processor 600 is taken as an example. The processor 600, the memory 601, the communication module 602, the input apparatus 603 and the output apparatus 604 in the computer device may be connected by a bus or other means. In FIG. 6, the connection by the bus is taken as an example.

As a computer-readable storage medium, the memory 601 may be configured to store software programs, and computer-executable programs and modules. The computer-readable storage medium may be a non-transitory computer readable medium. For example, the modules (for example, the anchor user recalling module 501, the anchor user classifying module 502, the interaction score calculating module 503, the comprehensive score calculating module 504 and the anchor information pushing module 505 in the apparatus for pushing the anchor information as shown in FIG. 5) correspond to the method for pushing the anchor information in the present embodiment. The processor 600 executes various functional applications and data processing of the computer device, namely, implements the above method for pushing the anchor information, by running the software programs, instructions and modules stored in the memory 601.

Embodiment 7

A computer-readable storage medium is further provided according to Embodiment 7. A computer program is stored in the computer-readable storage medium; and a processor, when executing the computer program, is caused to perform a method for pushing anchor information. The method includes:

recalling an anchor user; determining an anchor type of the anchor user by using a live streaming history and a live streaming efficiency as classification dimensions; calculating an interaction score of the anchor user, wherein the interaction score represents a feature of a viewer user viewing a live streaming room of the anchor user; calculating a comprehensive score of the anchor user based on the interaction score and the anchor type; and pushing anchor information of the anchor user to the viewer user based on the comprehensive score.

What is claimed is:

1. A method for pushing anchor information, comprising:
    recalling an anchor user;
    determining an anchor type of the anchor user by using a live streaming history and a live streaming efficiency as classification dimensions, wherein the live streaming history comprises a first live streaming starting time;
    calculating an interaction score of the anchor user, wherein the interaction score represents a feature of a viewer user viewing a live streaming room of the anchor user;
    calculating a comprehensive score of the anchor user based on the interaction score and the anchor type; and
    pushing anchor information of the anchor user to the viewer user based on the comprehensive score.

2. The method according to claim 1, wherein the anchor type of the anchor user comprises a first type, a second type, a third type, and a fourth type; wherein
    live streaming histories of anchor users in the first type and the second type are shorter than live streaming histories of anchor users in the third type and the fourth type;
    a live streaming efficiency of the anchor user in the first type is lower than a live streaming efficiency of the anchor user in the second type; and
    a live streaming efficiency of the anchor user in the third type is lower than a live streaming efficiency of the anchor user in the fourth type.

3. The method according to claim 2, wherein calculating the comprehensive score of the anchor user based on the interaction score and the anchor type comprises:
    in the case that the anchor type is the second type, calculating a boost score of the anchor user, wherein the boost score is negatively correlated with times of calculating the boost score; and acquiring the comprehensive score of the anchor user by adding a boost value to the interaction score; or
    in the case that the anchor type is the fourth type, determining an effective score of the anchor user, adjusting a proportion of the effective score, and calculating a product of the interaction score and the effective score subjected to the proportion adjustment as the comprehensive score of the anchor user; or
    in the case that the anchor type is the first type or the third type, determining the interaction score as the comprehensive score of the anchor user.

4. The method according to claim 3, wherein calculating the boost score of the anchor user comprises:
    determining a base score, wherein the base score is less than the interaction score of the anchor user in a specified ranking;

determining a boost coefficient, wherein the boost coefficient is negatively correlated with the times of calculating the boost score; and
calculating a product of the base score and the boost coefficient as the boost score.

5. The method according to claim 1, wherein determining the anchor type of the anchor user by using the live streaming history and the live streaming efficiency as the classification dimensions comprises:
determining a classification model, wherein the classification model is configured to classify the anchor user by using the live streaming history and the live streaming efficiency as the classification dimension;
acquiring an anchor live streaming feature associated with the anchor user;
outputting a probability that the anchor user belongs to each anchor type by inputting the anchor live streaming feature into the classification model for processing; and
determining, based on the probability, the anchor type to which the anchor user belongs.

6. The method according to claim 5, wherein outputting the probability that the anchor user belongs to each anchor type by inputting the anchor live streaming feature into the classification model for processing comprises:
in the case that a plurality of anchor live streaming features are present, determining a plurality of first parameters corresponding to the anchor live streaming features one by one, and a second parameter;
acquiring a first target value by calculating a sum of products of the anchor live streaming features and the first parameters;
acquiring a second target value by adding the second parameter to the first target value; and
acquiring the probability that the anchor user belongs to each anchor type by classifying the second target value using a softmax function.

7. The method according to claim 5, wherein determining the classification model comprises:
determining the anchor user, wherein the anchor user is associated with a first live streaming starting time and the anchor live streaming feature, and the first live streaming starting time represents the live streaming history;
calculating an effective score of the anchor user, wherein the effective score represents the live streaming efficiency;
determining the anchor type of the anchor user by using the first live streaming starting time and the effective score as the classification dimensions;
determining a first sample weight for the anchor user based on the anchor type; and
training a model using the anchor live streaming feature, the first sample weight and the anchor type as a training sample, and determining the trained model as the classification model.

8. The method according to claim 7, wherein calculating the effective score of the anchor user comprises:
acquiring first indexes when the anchor user performs live streaming;
configuring each of the first indexes with a first index weight;
calculating a product of the first index and the first index weight as a first single item efficiency; and
calculating a sum of all the first single item efficiencies as the effective score, wherein the effective score represents the live streaming efficiency.

9. The method according to claim 7, wherein determining the anchor type of the anchor user by using the first live streaming starting time and the effective score as the classification dimensions comprises:
in the case that a plurality of anchor users are present, classifying the plurality of the anchor users into a first group and a second group, wherein the first live streaming starting times of the anchor users in the first group are later than the first live streaming starting times of the anchor users in the second group;
determining anchor types of the anchor users in the first group as a first type and a second type, wherein the effective score of the anchor user in the first type is less than or equal to a first predetermined threshold, and the effective score of the anchor user in the second type is greater than the first predetermined threshold; and
determining anchor types of the anchor users in the second group as a third type and a fourth type, wherein the effective score of the anchor user in the third type is less than or equal to a second predetermined threshold, and the effective score of the anchor user in the fourth type is greater than the second predetermined threshold.

10. The method according to claim 9, wherein classifying the plurality of the anchor users into the first group and the second group comprises:
counting a quantile of the first live streaming starting time of each of the anchor users;
determining the first live streaming starting time corresponding to a specified quantile as a live streaming starting time threshold;
organizing anchor users whose first live streaming starting times are less than or equal to the live streaming starting time threshold in the plurality of the anchor users into the first group; and
organizing anchor users whose first live streaming starting times are greater than the live streaming starting time threshold in the plurality of the anchor users into the second group.

11. The method according to claim 9, wherein the first sample weights of the anchor users in the second type and the fourth type are greater than the first sample weights of the anchor users in the first type and the third type respectively; and
determining the first sample weight for the anchor user based on the anchor type comprises:
determining the effective scores of the anchor users in the second type and the fourth type as the first sample weights of the anchor users in the second type and the fourth type respectively, and
determining the first sample weights of the anchor users in the first type and the third type to specified first values, wherein the first values are less than the effective scores of the anchor users in the first type and the third type.

12. The method according to claim 1, wherein calculating the interaction score of the anchor user comprises:
determining a ranking model, wherein the ranking model is configured to calculate the interaction score of the anchor user;
acquiring an anchor live streaming feature associated with the anchor user, a viewer live streaming feature associated with a viewer user, and an interaction live streaming feature between the anchor user and the viewer user; and
outputting the interaction score by inputting the anchor live streaming feature, the viewer live streaming feature and the interaction live streaming feature into the ranking model for processing.

13. The method according to claim 12, wherein outputting the interaction score by inputting the anchor live streaming feature, the viewer live streaming feature and the interaction live streaming feature into the ranking model for processing comprises:
   determining third parameters respectively corresponding to the anchor live streaming feature, the viewer live streaming feature and the interaction live streaming feature, and a fourth parameter;
   acquiring a third target value by calculating a sum of products of the anchor live streaming feature and the corresponding third parameter, the viewer live streaming feature and the corresponding third parameter and the interaction live streaming feature and the corresponding third parameter;
   acquiring a fourth target value by adding the fourth parameter to the third target value; and
   acquiring the interaction score by classifying the fourth target value using a logistic regression function.

14. The method according to claim 12, wherein determining the ranking model comprises:
   determining an anchor user;
   acquiring an anchor live streaming feature associated with the anchor user, a viewer live streaming feature associated with a viewer user, and an interaction live streaming feature between the anchor user and the viewer user;
   determining an interaction score of the anchor user;
   setting a sample category for the anchor user based on the interaction score;
   setting a second sample weight of the anchor user based on the sample category; and
   training a model by using the anchor live streaming feature, the viewer live streaming feature, the interaction live streaming feature, the second sample weight and the sample category as a training sample, and determining the trained model as the ranking model.

15. The method according to claim 14, wherein determining the interaction score of the anchor user comprises:
   acquiring second indexes when the anchor user performs live streaming;
   configuring each of the second indexes with a second index weight;
   calculating a product of the second index and the second index weight as a second single item efficiency; and
   calculating a sum of all the second single item efficiencies as the interaction score of the anchor user.

16. The method according to claim 14, wherein determining the sample category for the anchor user based on the interaction score comprises:
   determining the sample category for the anchor user as a first category in the case that the interaction score is greater than a predetermined interaction threshold; and
   determining the sample category for the anchor user as a second category in the case that the interaction score is less than or equal to the predetermined interaction threshold.

17. The method according to claim 16, wherein
   the second sample weight of the anchor user in the first category is greater than the second sample weight of the anchor user in the second category; and
   determining the second sample weight of the anchor user based on the sample category comprises:
      determining the interaction score of the anchor user in the first category as the second sample weight of the anchor user in the first category, and
      determining a specified second value as the second sample weight of the anchor user in the second category, wherein the second value is less than the interaction score of the anchor user in the first category.

18. A computer device, comprising:
   at least one processor; and
   a memory configured to store at least one program;
   wherein the at least one processor, when loading and running the at least one program, is caused to perform:
      recalling an anchor user;
      determining an anchor type of the anchor user by using a live streaming history and a live streaming efficiency as classification dimensions, wherein the live streaming history comprises a first live streaming starting time;
      calculating an interaction score of the anchor user, wherein the interaction score represents a feature of a viewer user viewing a live streaming room of the anchor user;
      calculating a comprehensive score of the anchor user based on the interaction score and the anchor type; and
      pushing anchor information of the anchor user to the viewer user based on the comprehensive score.

19. A non-transitory computer-readable storage medium storing a computer program therein, wherein the computer program, when loaded and run by a processor, causes the processor to perform:
   recalling an anchor user;
   determining an anchor type of the anchor user by using a live streaming history and a live streaming efficiency as classification dimensions, wherein the live streaming history comprises a first live streaming starting time;
   calculating an interaction score of the anchor user, wherein the interaction score represents a feature of a viewer user viewing a live streaming room of the anchor user;
   calculating a comprehensive score of the anchor user based on the interaction score and the anchor type; and
   pushing anchor information of the anchor user to the viewer user based on the comprehensive score.

* * * * *